United States Patent
Shah et al.

(10) Patent No.: US 12,510,038 B2
(45) Date of Patent: Dec. 30, 2025

(54) DETECTION METHOD FOR DETECTING A SPEED SENSING ANOMALY OF AN INTERNAL COMBUSTION ENGINE AND DEVICE FOR DETECTING THE SPEED SENSING ANOMALY

(71) Applicant: Caterpillar Energy Solutions GmbH, Mannheim (DE)

(72) Inventors: Darshit Shah, Baden-Wüttemberg (DE); Florian Schmitt, Mannheim (DE); Jan-Rudolf Spitzer, Lampertheim (DE); Philipp Schramke, Mannheim (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 18/767,585

(22) Filed: Jul. 9, 2024

(65) Prior Publication Data
US 2025/0020087 A1    Jan. 16, 2025

(30) Foreign Application Priority Data
Jul. 10, 2023   (GB) .................................... 2310554

(51) Int. Cl.
*F02D 41/14*     (2006.01)
*F02D 41/00*     (2006.01)
*F02D 41/22*     (2006.01)

(52) U.S. Cl.
CPC ..... *F02D 41/1498* (2013.01); *F02D 41/0097* (2013.01); *F02D 41/22* (2013.01);
(Continued)

(58) Field of Classification Search
CPC .............. F02D 19/025; F02D 41/0097; F02D 41/1498; F02D 41/22; F02D 41/222;
(Continued)

(56) References Cited

U.S. PATENT DOCUMENTS 5,197,326 A * 3/1993 Palm ................... F02D 41/0097
73/114.25
5,365,904 A * 11/1994 Nofsinger ............. F02D 41/222
123/359

(Continued)

FOREIGN PATENT DOCUMENTS

CN          115288870 A    11/2022
DE     102015223726 A1     6/2017
(Continued)

OTHER PUBLICATIONS

Great Britain Search Report related to Application No. GB2310554.7, reported on Dec. 19, 2023.
(Continued)

*Primary Examiner* — John M Zaleskas (57) ABSTRACT

The present invention pertains to a detection method for detecting a short-lived speed sensing anomaly of an internal combustion engine. The detection method comprises the steps of performing a sensor health check, detecting an engine speed deviation, performing a torque deviation check and identifying whether the detected engine speed deviation refers to a short-lived speed sensing anomaly based on the sensor health check and the torque deviation check. Furthermore, a device suitable for carrying out the detection method according to the present disclosure may be provided, comprising a control unit configured to perform the detection method according to the invention.

12 Claims, 4 Drawing Sheets

(52) U.S. Cl.
CPC ...... *F02D 41/222* (2013.01); *F02D 2041/227* (2013.01); *F02D 2200/0406* (2013.01); *F02D 2200/1002* (2013.01); *F02D 2200/1004* (2013.01); *F02D 2200/1012* (2013.01); *F02D 2250/18* (2013.01)

(58) Field of Classification Search
CPC ..... F02D 2200/1002; F02D 2200/1004; F02D 2200/101; F02D 2200/1012; F02D 2200/1015; G01M 15/044; G01M 15/046; G01M 15/05; G01M 15/11
See application file for complete search history.

(56) References Cited

U.S. PATENT DOCUMENTS

| | | | | |
|---|---|---|---|---|
| 5,529,041 | A * | 6/1996 | Andrews | G01M 15/11 |
| | | | | 123/436 |
| 5,592,388 | A * | 1/1997 | Bradshaw | G01M 15/11 |
| | | | | 123/436 |
| 5,659,134 | A * | 8/1997 | Tanaka | F02D 41/009 |
| | | | | 123/436 |
| 5,699,771 | A * | 12/1997 | Tanabe | F02D 41/222 |
| | | | | 73/114.27 |
| 5,936,152 | A | 8/1999 | Nishiok et al. | |
| 9,194,321 | B1 * | 11/2015 | Porlick | F02D 41/222 |
| 2003/0196643 | A1 * | 10/2003 | Friedrich | F02D 41/009 |
| | | | | 123/478 |
| 2005/0159877 | A1 * | 7/2005 | Hattori | F02D 41/009 |
| | | | | 73/114.26 |
| 2005/0257977 | A1 * | 11/2005 | Kamiya | B60L 3/04 |
| | | | | 180/171 |
| 2006/0021450 | A1 * | 2/2006 | Nallapa | G01P 3/481 |
| | | | | 73/862.326 |
| 2006/0075808 | A1 * | 4/2006 | An | F02D 41/222 |
| | | | | 73/114.25 |
| 2008/0059017 | A1 * | 3/2008 | Thor | G05B 9/02 |
| | | | | 701/29.2 |
| 2009/0222162 | A1 * | 9/2009 | Carlton | G01M 15/042 |
| | | | | 701/29.2 |
| 2010/0175664 | A1 * | 7/2010 | Genslak | F02P 5/1506 |
| | | | | 701/103 |
| 2010/0324799 | A1 * | 12/2010 | Davison | G01P 21/02 |
| | | | | 702/183 |
| 2011/0266985 | A1 * | 11/2011 | Eisenhardt | H02P 1/022 |
| | | | | 318/400.21 |
| 2016/0133064 | A1 | 5/2016 | Patino et al. | |
| 2016/0160768 | A1 * | 6/2016 | Koo | F02D 31/001 |
| | | | | 123/339.15 |
| 2016/0202146 | A1 * | 7/2016 | Enomoto | F02D 41/009 |
| | | | | 73/114.26 |
| 2017/0002763 | A1 * | 1/2017 | Oono | F02D 11/105 |
| 2018/0080404 | A1 * | 3/2018 | Nair | G01P 21/02 |
| 2019/0085784 | A1 * | 3/2019 | Oono | F02D 41/26 |
| 2019/0301378 | A1 * | 10/2019 | Barrho | F02D 41/222 |
| 2020/0032723 | A1 * | 1/2020 | Rajkumar | G01M 15/06 |
| 2021/0380266 | A1 | 12/2021 | Theriault et al. | |
| 2023/0296063 | A1 * | 9/2023 | Shah | G01M 15/11 |
| | | | | 123/436 |
| 2023/0304894 | A1 * | 9/2023 | Shah | F02D 29/06 |
| 2023/0340921 | A1 * | 10/2023 | Shah | F02D 41/1498 |
| 2025/0035059 | A1 * | 1/2025 | Huber | F02D 35/024 |

FOREIGN PATENT DOCUMENTS

| | | | |
|---|---|---|---|
| EP | 3103989 A1 | | 12/2016 |
| GB | 2582001 | | 9/2020 |
| JP | 02030937 A | * | 2/1990 |
| JP | 06081706 A | * | 3/1994 |
| JP | H08296489 A | | 11/1996 |
| JP | 2011024354 A | * | 2/2011 |
| JP | 5044613 B2 | | 10/2012 |
| JP | 2014006152 A | | 1/2014 |
| JP | 2020133547 A | * | 8/2020 |
| KR | 20030029282 A | * | 4/2003 |
| WO | WO-2004013477 A1 | * | 2/2004 ........... F02D 41/222 |

OTHER PUBLICATIONS

European Extended Search Report for EP Patent Appln. No. PCT/US2024/042010, mailed Dec. 5, 2024 (10 pgs).

* cited by examiner

DETECTION METHOD FOR DETECTING A SPEED SENSING ANOMALY OF AN INTERNAL COMBUSTION ENGINE AND DEVICE FOR DETECTING THE SPEED SENSING ANOMALY

CROSS-REFERENCE TO RELATED APPLICATION

This application claims priority under 35 USC § 119 and the Paris Convention to Great Britain Patent Application No. 2310554.7 filed on Jul. 10, 2023.

TECHNICAL FIELD

The present invention pertains to a detection method for detecting a short-lived or abrupt speed sensing anomaly in an internal combustion engine, in particular for stationary gas engines. Further, the invention pertains to an associated device for detecting a speed sensing anomaly of an internal combustion engine according to the detection method disclosed herein.

TECHNOLOGICAL BACKGROUND

Internal combustion engines, and in particular stationary gas engines, may suffer from various abnormal combustion phenomena that may lead to deterioration and/or performance reduction of the engine. Such abnormal combustion phenomena may be caused by various reasons such as an improper gas-air/fuel-air mixture in the combustion chamber, damaged valves, an improperly adjusted valve lash, engine or intake air temperature being too low, spark plug temperature being too low, improperly adjusted spark ignition time and many more.

Abnormal combustion may particularly result in engine knocking or surface ignition in the combustion chamber. Both phenomena may result in engine damage or considerable reduction of engine performance. In order to prevent such phenomena, appropriate measures have to be taken to reliably prevent these.

Since any abnormal combustion has an impact on the engine speed, engine speed sensing is commonly used as one of the key measures to detect abnormal combustion phenomena. In particular, speed sensing is used to detect abnormal speed deviations to which the engine may react by a control system configured to receive the speed signals and initiate appropriate measures to counteract the speed deviations. It is thus of particular importance that the speed sensing is reliable and that potential sensing failures are detected as such, otherwise the engine control system may react to an apparent speed deviation and may thus deteriorate engine performance and/or cause engine or component damage.

In the prior art, monitoring of the engine speed has been mainly used to detect sustaining, i.e. long-term component and/or sensor failures of the engine. However, there have been no methods disclosed in the prior art that are able to detect a short-lived or abrupt fault of a speed sensor.

The prevention of improper combustion phenomena due to short-lived or abrupt engine speed sensing anomalies may however be critical for the engine performance and/or for the prevention of damaging effects to the engine. It is thus a desire to reliably detect short-lived speed sensing anomalies so as to prevent any disadvantages arising therefrom. A particular challenge herein is the distinction between real (physical) speed anomalies and apparent speed anomalies.

SUMMARY OF THE INVENTION

Starting from the prior art, it is an objective of the present invention to provide a method and device configured to reliably detect short-lived speed anomalies of an internal combustion engine.

This objective is solved by means of a detection method for detecting a short-lived speed anomaly of an internal combustion engine with the features of claim 1 and a device for detecting such short-lived speed anomaly with the features of claim 12. Preferred embodiments are set forth in the present specification, the Figures as well as the dependent claims.

Accordingly, a detection method for detecting a short-lived speed anomaly of an internal combustion engine is suggested, the method comprising the steps of performing a sensor health check, detecting an engine speed deviation, performing a torque deviation check and identifying whether the detected engine speed deviation refers to a short-lived speed sensing anomaly based on the sensor health check and the torque deviation check.

Furthermore, a device suitable for implementing the method according to the present disclosure may be provided, comprising a control unit configured to perform the steps according to the detection method.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

In the following, the invention will be explained in more detail with reference to the accompanying Figures. In the Figures, like elements are denoted by identical reference numerals and repeated description thereof may be omitted in order to avoid redundancies.

The present disclosure is generally directed towards a detection method for detecting a short-lived speed anomaly of an internal combustion engine. In particular, it is directed towards a method for identifying whether a detected speed deviation refers to a speed sensing anomaly caused by e.g. a sensor failure—to which an engine control system should not react—or to a real, physical speed deviation—to which the engine control system should react. In other words, the present invention provides a validation method for a short-lived speed sensing anomaly.

In more detail, the detection method according to the invention is characterized by performing a sensor health check so as to ensure proper function of the associated sensor and thus exclude sensor malfunction to be the cause of an apparent speed sensing anomaly. Further, a torque deviation check is performed to check whether a detected speed deviation (after the sensor health check passed) actually affects the power output/torque of the engine. Depending on whether the torque is affected or not, a speed sensing anomaly may either be validated or not validated.

Figure 1:
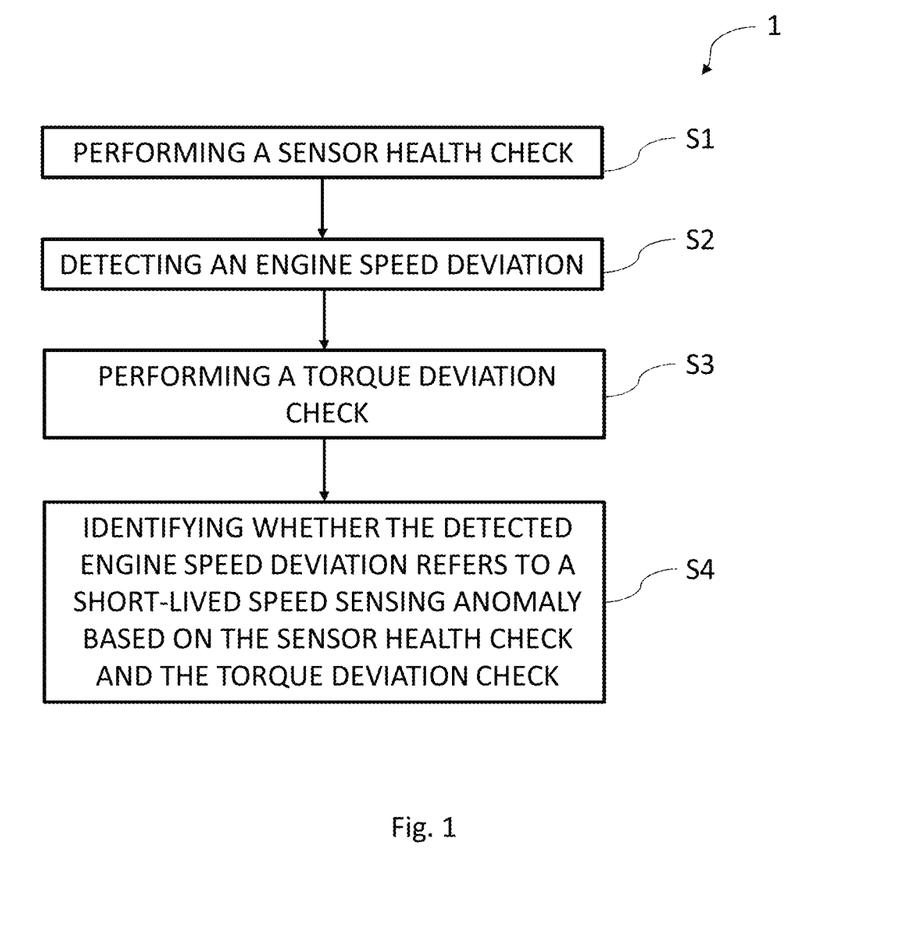
FIG. 1 schematically shows a flow chart of a detection method for detecting a short-lived speed anomaly according to the invention.

In FIG. 1, a flow chart for the detection method for detecting a short-lived speed sensing anomaly of an internal combustion engine according to the present disclosure is illustrated. Therein, the detection method comprises the steps of performing S1 a sensor health check, detecting S2 an engine speed deviation, performing S3 a torque deviation check and identifying S4 whether the detected speed deviation refers to a short-lived speed sensing anomaly based on the sensor health check and on the torque deviation check.

In the case of a stationary gas engine, the engine may be started while the operating state of the engine is monitored and it may be determined in which state the engine is running prior to the detection method according to the invention being initiated. Once the engine reaches a mature operating state, from which an output of power is possible, the detection method according to the invention may be initiated.

It may be determined whether the stationary gas engine is operating in island mode or grid parallel mode. The detection method according to the invention may be adapted to process the relevant signals associated with the sensors being used for the speed anomaly detection method in the particular running mode.

The sensor health check is performed in step S1. In the context of the present disclosure, a sensor health check is to be understood as a functionality test of one or more sensors. These sensors may comprise any sensors that may be relevant for the detection and/or validation of a speed sensing anomaly in accordance with the present disclosure.

The sensor health check may be performed continuously during engine operation. Thus, the sensor functionality may be monitored continuously during engine operation, such that a potential failure of any sensor may be detected at any time. The term continuously monitoring includes a situation in which the monitoring is conducted cyclically synchronized with the CPU cycle and/or the sensor output cycle or a multiple thereof.

Alternatively, the sensor health check may be performed periodically. For example, the sensor health check may be performed at the very start of the detection method according to the present invention and then be repeated successively in certain time intervals.

The sensors being checked during the sensor health check may comprise an engine speed sensor. The engine speed may for example be measured using pick-up sensors on a crankshaft or a cam of the engine.

Further, the sensors being checked may comprise a sensor measuring the output power and/or torque of the engine. For example, the output power of a stationary gas engine connected to an electrical grid may be measured by calculating the power from a current transformer and/or a potential transformer of an electrical generator connected to the combustion engine.

Further sensors being checked during the sensor health check may comprise a sensor indicative of an intake manifold pressure, an intake manifold temperature or an intake manifold density. The intake manifold pressure and intake manifold temperature are measures for the pressure and temperature of the gas-air or fuel-air mixture present in the intake manifold. The intake manifold density may be derived from the intake manifold temperature and pressure. The pressure and temperature may be determined by a pressure sensor and a thermocouple sensor, respectively.

Moreover, a sensor indicative of the emission levels of the engine may be comprised. The emission levels may be determined by a lambda sensor.

In case of a sensor being non-functional, the system cannot ensure normal engine operation and thus abnormal combustion phenomena may occur. According to an embodiment, a protective action may thus be activated so as to prevent engine damage and/or reduction of engine performance if the sensor health check is failing due to one or more of the sensors being non-functional.

The protective action may include means to prevent knocking of the engine and/or to activate a surge protection. Exemplary means for protection may include retarding the ignition timing of the engine to safe levels, decoupling the engine from loads and/or shutting off a fuel/gas supply to the engine.

By retarding the ignition timing, normal combustion of the engine may be ensured in exchange for a slight reduction of engine efficiency. Decoupling the engine from loads ensures that the engine can run freely so as to prevent any component damage resulting from the engine being coupled to loads during abnormal combustion phenomena. Further, it may also work as a surge protection when the engine is decoupled from an electrical grid. By shutting off the gas or fuel supply to the engine, any abnormal combustion is suppressed immediately and thus prevents component damage to the engine.

Referring to FIG. 1, an engine speed deviation detection is performed in step S2. According to the invention, any means for detecting a speed deviation of the engine is comprised herein. The engine speed is monitored by measuring the speed over time.

In the most general sense, a speed deviation according to the invention may be considered as any deviation of the engine speed from a predetermined value or range of values. The deviation may be detected by a software configured to record the engine speed signal from an associated sensor over time and to produce a signal in case the measured engine speed deviates from the predetermined value or range of values.

According to an embodiment, the speed deviation is detected if the monitored engine speed exceeds or subceeds a predetermined steady state band condition and/or if a rate of change of the engine speed exceeds a predetermined threshold.

Figure 2:
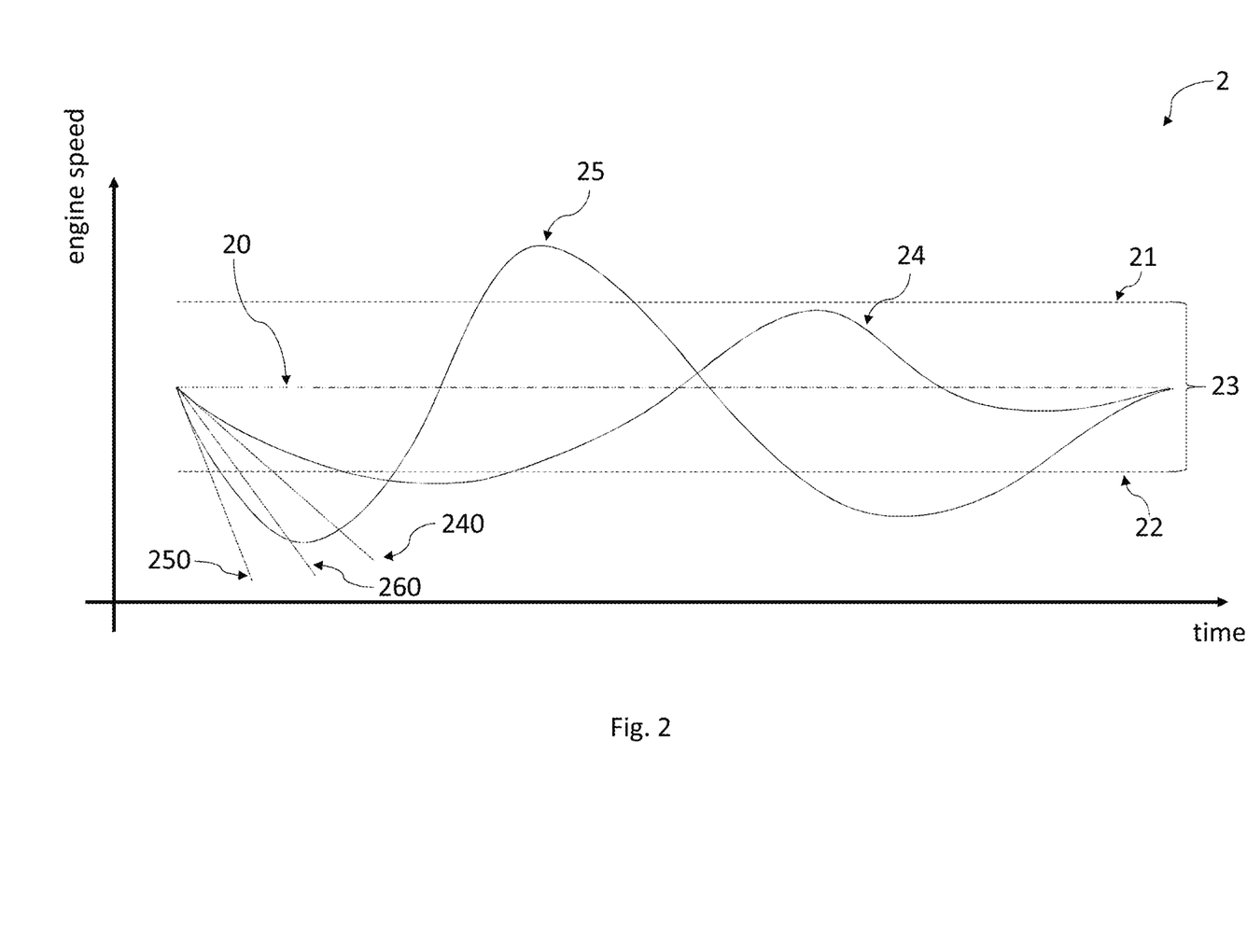
FIG. 2 shows an exemplary scenario of two different engine speed signals monitored over time.

The steady state band condition may be more clearly understood with reference to FIG. 2, where exemplary measurements 2 of the engine speed are shown as a function of time. A band width 23 of the steady state band condition may be defined by an upper boundary 21 and a lower boundary 22 of the engine speed. In one embodiment, the upper and lower boundary 21, 22 may be symmetrically arranged around a target speed value 20 as shown in FIG. 2. Alternatively, the upper and lower boundary 21, 22 may also be arranged asymmetrically around the target value 20. The target speed value 20 may be constant. In general, the steady state band condition defines a range of engine speed values around the target speed value 20 within which the engine speed is considered to conform to normal engine operation and thus no abnormal combustion phenomena may be expected.

The rate of change of the engine speed is illustrated for a first engine speed signal 24 and a second engine speed signal 25 by straight dashed lines 240 and 250, respectively. Further, a predetermined threshold rate of change 260 is illustrated by another dashed line. The lines 240 and 250 are characterized in being tangential to the speed signals at the points of maximum rate of change, i.e. where the slope of the lines 240 and 250 reach their maximum. Thus, the lines 240 and 250 illustrate a rate of change of engine speed at the points where the lines are tangential to the first and second speed signals 24 and 25, respectively. The predetermined threshold rate of change 260 refers to a predetermined value of the rate of change above which the engine operation may be considered as abnormal.

According to an embodiment, a speed deviation may be detected if either one of the two conditions is met. Thus, a speed deviation may be detected when the engine speed exceeds or subceeds the predetermined steady state band width 23 but the rate of change of the engine speed may not exceed the predetermined threshold rate of change 260. Correspondingly, a speed deviation may be detected when the engine speed does not exceed or subceed the predetermined steady state band width 23 but the rate of change of the engine speed exceeds the predetermined threshold rate of change 260.

According to another preferred embodiment, a speed deviation may only be detected if the two conditions are met simultaneously. Hence, a speed deviation may only be detected if the monitored engine speed exceeds or subceeds the band width 23 of the predetermined steady state band condition and if the rate of change of the engine speed exceeds the predetermined threshold rate of change 260.

In the example shown in FIG. 2, the first speed signal 24 exceeds the steady state band condition 23 at a certain time interval. However, the rate of change 240 of the first engine speed signal 24 does not exceed the predetermined threshold rate of change 260. Accordingly, a speed deviation may be detected or not detected depending on the embodiment.

The second speed signal 25, on the other hand, exceeds the steady state band condition 23 and also exhibits a rate of change 250 exceeding the predetermined threshold rate of change 260. Accordingly, a speed deviation would be detected for any of the disclosed embodiments for the second speed signal 25.

In the next step S3 according to the invention, a torque deviation check is performed. The torque deviation check is performed so as to validate whether an engine speed deviation detected in the foregoing step refers to an actual real speed deviation of the engine or whether the detected speed deviation is rooted in a speed sensing anomaly/speed sensor failure.

In the most general sense, the torque deviation check comprises any means suitable to test whether the torque of the engine conforms to the speed deviation detected in the foregoing step. If the speed deviation refers to a real, physical speed deviation, a considerable impact on the engine torque and thus a torque deviation is expected. In case the speed deviation is only apparent due to a speed sensing anomaly, no considerable torque deviation is expected.

According to an embodiment, the torque deviation check may be performed by comparing one or more measured key parameters indicative of the engine torque to a pre-calibrated band of values for the key parameters. Hence, the comparison is performed by monitoring the key parameters as a function of time so as to check for any changes of engine torque and compare those to an acceptable band of values within which normal engine operation is considered. This comparison is performed for a specific engine torque which complies with the engine speed target value 20 at which the engine is currently operated. Thus, the pre-calibrated band of key parameter values may be given as a function of engine torque and/or output power of the engine.

Generally, the key parameters refer to almost any engine specific and/or combustion-related parameters that are characterized in being directly or indirectly indicative of the engine torque and may be measured in or adjacent to the combustion engine via appropriate sensors. It is to be noted that although the engine speed is directly indicative of the engine torque, it may typically not be comprised in the key parameters. This is because the engine speed refers to the parameter which is ought to be tested for a potential sensing anomaly according to the invention. Hence, the key parameters indicative of the engine torque may typically be any appropriate parameter different from the engine speed. However, the engine speed may still be used as a key parameter provided that the torque deviation check measures the engine speed via a different engine speed sensor than what has been measured during the speed deviation detection of step S2.

The pre-calibrated band of values for the key parameters refer to predetermined values for the key parameters, wherein the band width may be selected such that even the most severe scenarios of torque changes during normal engine operation are included. Defining the band width in this way avoids the torque deviation check to result in false positively detected torque deviations. Accordingly, the torque deviation check may suggest normal engine operation when the measured key parameters fall within the pre-calibrated band of values and abnormal combustion may be suggested when the measured key parameters do not fall within the pre-calibrated band of values.

Generally, according to this embodiment, the torque deviation check is considered to be passed if the measured key parameters fall within the pre-calibrated band of values for the key parameters and is considered to be failed if the measured key parameters are deviating from the pre-calibrated band of values for the key parameters. Passing the torque deviation check means that a speed deviation detected in step S2 is only apparent and thus refers to a speed sensing anomaly. Failing the torque deviation check on the other hand means that a speed deviation detected in step S2 is real and thus does not refer to a speed sensing anomaly.

According to some embodiments, the key parameters indicative of the engine torque are given by appropriate output power signals of the engine, the engine speed, an intake manifold pressure, an intake manifold temperature, an intake manifold density and/or emission levels of the engine.

Each of these key parameters may be given as a function of engine torque and/or power. According to this embodiment, the key parameters indicative of the engine torque are given as a function of engine torque and/or engine power via 2D look-up tables and/or an appropriate mathematical model, wherein the 2D look-up tables and the mathematical model are configured to define the pre-calibrated band of values for the key parameters within which the measured key parameters are considered to indicate normal engine operation.

Figure 3:
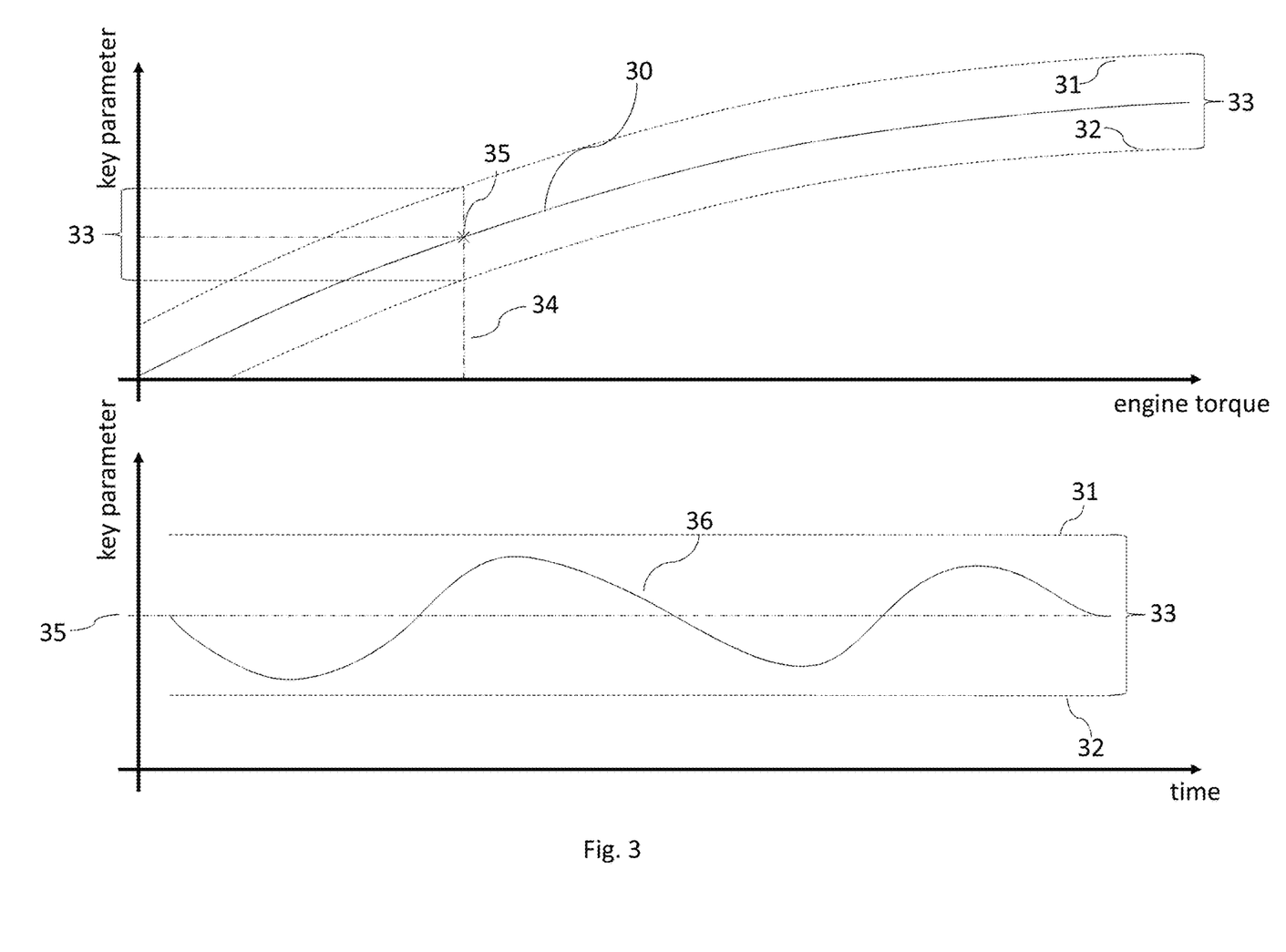
FIG. 3 shows a mathematical model of a key parameter as a function of engine torque and a pre-calibrated band of key parameter values according to an embodiment.

The torque deviation check according to this embodiment may be more clearly understood with reference to FIG. 3. In the upper panel of FIG. 3, an exemplary mathematical model of a key parameter as a function of engine torque is shown. Here, the functional dependency is given by the mathematical model curve 30, around which an upper and lower boundary 31, 32 as a function of engine torque is included. It is noted that the specific functional dependence shown in FIG. 3 is only for the purpose of illustrating the torque deviation check and may not necessarily refer to an actual real dependency. The upper and lower boundary 31, 32 define the band width 33 of the pre-calibrated band of key parameter values, within which the engine operation for a specific engine torque is considered to be normal.

According to this embodiment, an engine torque 34 corresponding to the engine speed target value 20 at which the engine is supposed to run is used to determine the corresponding key parameter value 35 from the mathematical model curve 30. Then, the band width 33 can be defined within which the key parameters are supposed to be for the current engine speed target value 20/engine torque 34 if normal engine operation is considered.

In the lower panel of FIG. 3, an exemplary monitored key parameter signal 36 over time is shown. Here, the band width 33 of the pre-calibrated key parameter values with upper and lower boundaries 31, 32 is situated around the key parameter value 35 determined from the mathematical model curve 30. In the shown example, the key parameter signal 36 does not deviate from the pre-calibrated band of key parameter values as it falls within the band width 33. Accordingly, in this example, the torque deviation check passed as there is no considerable torque deviation detected.

According to another embodiment, the detected engine speed deviation is identified as a speed sensing anomaly if the sensor health check passed and the torque deviation check failed, while no engine speed sensing anomaly is identified if the sensor health check failed and/or the torque deviation check passed.

As a consequence, if the speed deviation detection suggests a deviating speed signal, a speed sensing anomaly may be detected only if the torque deviation check suggests a non-deviating engine torque.

Similar to the case when the sensor health check fails, a protective action so as to prevent engine damage and/or reduction of engine performance is activated in case of an engine speed sensing anomaly being identified. The protective actions are given by the same actions discussed in the corresponding embodiments discussed above.

The protective action when a speed sensing anomaly is identified is for the purpose of preventing the engine to react to apparent speed deviations. If no protective action would be initiated in such case, the engine would try to counteract a speed deviation that is not real, which could result in severe reduction of engine performance and/or engine/component damage.

According to the invention, a device for detecting a short-lived speed anomaly of an internal combustion engine is disclosed. The device comprises a control unit configured to perform a sensor health check, detecting an engine speed deviation, performing a torque deviation check and identifying whether the detected engine speed deviation refers to a short-lived speed sensing anomaly based on the sensor health check and the torque deviation check.

Figure 4:
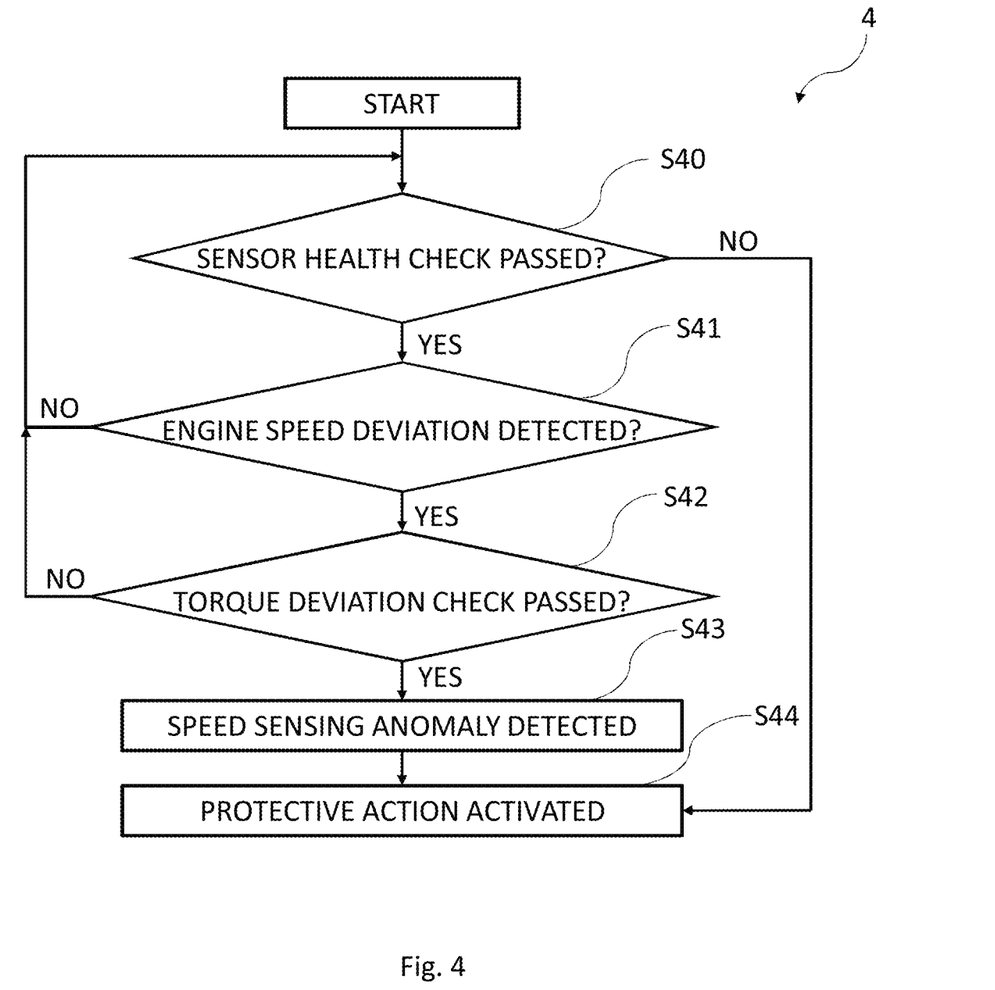
FIG. 4 shows a flow chart of an algorithm according to an embodiment, configured to execute the detection method according to the invention.

According to a particularly preferred embodiment, the control unit may be configured to perform an algorithm 4 according to FIG. 4.

The algorithm 4 may be started after the engine reached a mature operating state in which the output of power is possible. Then, it proceeds to a step S40 checking whether the sensor health check passed. For example, the sensor health check may be performed for an engine speed sensor and an intake manifold pressure sensor. Only if both of the sensor pass the sensor health check, the algorithm may proceed to the next step S41. If one or more of the sensors fail the sensor health check due to malfunctioning, the algorithm 4 may proceed directly to step S44, wherein a protective action according to some embodiments of the present disclosure may be activated.

In general, the algorithm may decide that even if not all of the sensors pass the sensor health check, the algorithm may still proceed to step S41. This may be the case if those sensors that do pass the sensor health check are suitable for implementing the successive steps required for the detection method according to the invention.

If, for example, next to the engine speed sensor and the intake manifold pressure sensor a further sensor indicative of the engine torque is comprised, as for example an intake manifold temperature sensor, and only the intake manifold pressure sensor or intake manifold temperature sensor fail the sensor health check but the others pass, the algorithm may still proceed to the next step S41 instead of S44 as the remaining sensor are still suitable to perform the engine speed deviation check and the torque deviation check.

In step S41, the algorithm 4 checks whether an engine speed deviation is detected. The control unit thus performs the step of detecting an engine speed deviation in accordance with corresponding embodiments disclosed herein. In case no engine speed deviation is detected, the algorithm 4 may start from above and thus proceed to step S40. In case an engine speed deviation is detected, it proceeds to step S42, wherein the torque deviation check is performed.

Accordingly, in step S42, the algorithm 4 checks whether the engine torque conforms to the speed deviation detected in the foregoing step S41. For example, the engine torque deviation may be performed by monitoring the intake manifold pressure as a function of time and checking whether it lies within an expected range of values that may be given by the pre-calibrated band of key parameter values. In case the torque deviation check fails, i.e. a torque deviation has been detected, the algorithm 4 proceeds to the start performs step S40. In case the torque deviation check passes, i.e. a torque deviation has not been detected, the algorithm 4 proceeds to the next step S43 and S44.

In steps S43 and S44, the speed sensing anomaly is detected and thus a protective action according to some embodiments of the present invention will be activated.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

INDUSTRIAL APPLICABILITY

The detection method for detection of a short-lived speed sensing anomaly of the present disclosure is suitable for being used in internal combustion engines having speed sensors and sensors to measure parameters indicative of an engine torque. The present invention is particularly designed to be advantageous for stationary gas engines that are designed to be connected to an electrical grid for electrical power generation. The detection method for detecting a short-lived speed anomaly generally aims at providing a reliable method for detecting short-lived speed sensing anomalies that may be detrimental to the engine if not detected reliably.

To address this, a detection method for a short-lived engine speed sensing anomaly is provided, comprising the steps of performing a sensor health check, detecting an engine speed deviation, performing a torque deviation check and identifying whether the detected engine speed deviation refers to a short-lived speed sensing anomaly based on the sensor health check and the torque deviation check. Furthermore, a device suitable for implementing the method according to the present disclosure may be provided, comprising a control unit configured to perform the steps according to the detection method.

In the following, various advantageous effects according to the invention and according to preferred embodiments are disclosed. The advantages refer to both the detection method for a short-lived engine speed sensing anomaly as well as to the associated device according to the invention.

Performing a sensor health check and torque deviation check according to the invention provides a fast and reliable method for validating an engine speed deviation detected by an associated speed sensor. The sensor health check ensures that any sensor used for the detection method according to the present disclosure is fully functional and thus prevents false-positive detections of for example speed deviations or torque deviations that may make the engine trying to correct itself for no reason. Together with the validation method in form of the torque deviation check according to the invention, a way to detect whether short-lived speed deviations are real or apparent due to a sensor failure, i.e. referring to a speed sensing anomaly, is provided. This is greatly advantageous since short-lived speed sensing anomalies, if not being identified as such, may lead to intense reactions of the engine trying to correct itself. By virtue of the present invention, such damaging and/or performance reducing effects due to unidentified speed sensing anomalies are prevented.

According to a preferred embodiment, the sensor health check comprises a functionality test of various sensors such as an engine speed sensor, a sensor indicative of engine power and/or engine torque, a sensor indicative of an intake manifold pressure, an intake manifold temperature, an intake manifold density and/or a sensor indicative of the emission levels of the engine. The use of a multitude of these sensors may be advantageous since in the case that one of the sensors fails the sensor health check, the detection method according to the invention may still be implemented with one or more of the remaining sensors.

According to a further embodiment, a protective action may be activated when failing the sensor health check. In this way, potential engine damage and/or performance reduction may be prevented.

According to a particularly preferred embodiment, a speed deviation is detected if the monitored engine speed exceeds/subceeds a predetermined steady state band condition defined around an engine speed target value and if a rate of change of the engine speed exceeds a predetermined threshold rate of change of the engine speed. By limiting the engine speed deviation to be detected only when both of these conditions are met, false-positive engine speed deviation detections may be avoided. Hence, performing the engine speed deviation detection this way makes the detection method according to the invention more reliable.

According to a preferred embodiment, the torque deviation check may be performed by monitoring one or more key parameters indicative of the engine torque at a specific engine torque corresponding to the engine speed target value over time and testing whether the monitored key parameters exceed/subceed a pre-calibrated band of key parameter values at the specific engine torque. By virtue of this embodiment, the detection method, and in particular the torque deviation check, may be implemented based on a quantitative condition that defines whether the torque deviates or not. Accordingly, the detection method according to this embodiment provides a precise and reliable method of validating a short-lived speed sensing anomaly.

The key parameters indicative of the engine torque may be given by appropriate output power signals of the engine, the engine speed, an intake manifold pressure, an intake manifold temperature, an intake manifold density and/or emission levels of the engine. These particular parameters refer to standard measurements used in combustion engines and particularly stationary gas engines. Using these specific parameters may thus be advantageous as there is no need to add further sensors to an engine as these are mostly already included in existing engines.

In a further preferred embodiment, the pre-calibrated band of key parameter values is configured such that even the most severe key parameter changes that are still considered to be indicating normal engine operation are included. In other words, the band width of the pre-calibrated key parameter values is chosen rather wide, thus avoiding false-positive detections in the torque deviation check. Otherwise, there might be detected a torque deviation to which the engine reacts, although the engine runs normally and no correcting would have been necessary.

According to a further preferred embodiment, a surge and/or knock protection action is performed when the detected engine speed deviation is identified as a speed sensing anomaly. In particular, the surge and/or knock protection action may be performed by retarding the ignition timing of the engine to safe levels, decoupling the engine from loads and/or shutting off a fuel/gas supply to the engine. Any of these measures ensures a safe way to prevent any engine damage that may be caused by a speed sensing anomaly.

What is claimed is:

1. A method for detecting a speed sensing anomaly of an internal combustion engine, comprising the steps of:
   performing a sensor health check on a sensor of the internal combustion engine;
   detecting an engine speed deviation of the internal combustion engine;
   determining an actual torque of the internal combustion engine;
   performing a torque deviation check of the internal combustion engine based at least in part upon the actual torque and a torque associated with the engine speed deviation;
   identifying that the engine speed deviation refers to the speed sensing anomaly based on the sensor health check and the torque deviation check; and
   adjusting operation of the internal combustion engine to provide a protective action based at least in part upon identifying the speed sensing anomaly.

2. The method according to claim 1, wherein the sensor includes an engine speed sensor, a sensor indicative of engine power, a sensor indicative of engine torque, a sensor indicative of an intake manifold pressure, a sensor indicative of an intake manifold temperature, a sensor indicative of an intake manifold density, and/or a sensor indicative of emission levels of the internal combustion engine.

3. The method according to claim 2, wherein performing the sensor health check comprises checking whether the sensor is functional.

4. The method according to claim 3, wherein the protective action comprises a surge action and/or a knock protection action.

5. The method according to claim 4, wherein the protective action is performed by retarding an ignition timing of the internal combustion engine to safe levels, decoupling the internal combustion engine from loads and/or shutting off a fuel or gas supply to the internal combustion engine.

6. The method according to claim 1, wherein the engine speed deviation includes at least one of monitored engine speed over time that exceeds or subceeds a bandwidth of a predetermined steady state band condition defined around an engine speed target value and/or a rate of change of the monitored engine speed that exceeds a predetermined threshold rate of change of the monitored engine speed.

7. The method according to claim 1, wherein the torque deviation check is performed by monitoring one or more key parameters indicative of an engine torque at a specific engine torque corresponding to an engine speed target value over time and testing whether the one or more key parameters exceed or subceed a pre-calibrated band of key parameter values at the specific engine torque, wherein a passed engine torque check is defined by the one or more key parameters being within the pre-calibrated band of key parameter values and a failed engine torque check is defined by the one or more key parameters not being within the pre-calibrated band of key parameter values.

8. The method according to claim 7, wherein the one or more key parameters indicative of the engine torque are given by appropriate output power signals of the internal combustion engine, an engine speed, an intake manifold pressure, an intake manifold temperature, an intake manifold density and/or emission levels of the internal combustion engine.

9. The method according to claim 7, wherein the one or more key parameters indicative of the engine torque are given as a function of engine torque and/or engine power via look-up tables and/or a mathematical model, wherein the look-up tables and the mathematical model are configured to define the pre-calibrated band of key parameter values.

10. The method according to claim 1, wherein the engine speed deviation is identified as the speed sensing anomaly upon determining the sensor health check passes and the torque deviation check passes, and wherein no engine speed sensing anomaly is identified upon determining the sensor health check fails and/or determining the torque deviation check fails.

11. The method according to claim 10, wherein the protective action is activated upon identifying that the engine speed deviation refers to the speed sensing anomaly.

12. A device for detecting a speed sensing anomaly of an internal combustion engine, comprising a control unit that:
performs a sensor health check on a sensor of the internal combustion engine;
detects an engine speed deviation of the internal combustion engine;
determines an actual torque of the internal combustion engine;
performs a torque deviation check of the internal combustion engine based at least in part upon the actual torque and a torque associated with the engine speed deviation;
identifies whether the engine speed deviation refers to the speed sensing anomaly based on the sensor health check and the torque deviation check; and
adjusts operation of the internal combustion engine to provide a protective action based at least in part upon identifying the speed sensing anomaly.

* * * * *